United States Patent
Niki

(10) Patent No.: US 7,324,208 B2
(45) Date of Patent: Jan. 29, 2008

(54) OPTICAL FREQUENCY MEASUREMENT APPARATUS AND OPTICAL FREQUENCY MEASUREMENT METHOD

(75) Inventor: Shoji Niki, Tokyo (JP)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 11/504,982

(22) Filed: Aug. 16, 2006

(65) Prior Publication Data

US 2007/0024855 A1 Feb. 1, 2007

Related U.S. Application Data

(63) Continuation of application No. PCT/JP2004/017962, filed on Dec. 2, 2004.

(30) Foreign Application Priority Data

Mar. 26, 2004 (JP) .............................. 2004-093491

(51) Int. Cl.
G01B 9/02 (2006.01)
G01J 3/45 (2006.01)
H01S 3/13 (2006.01)
(52) U.S. Cl. .................. 356/484; 356/451; 372/32
(58) Field of Classification Search ................ 356/450, 356/451, 484; 372/32
See application file for complete search history.

(56) References Cited

U.S. PATENT DOCUMENTS 4,905,244 A * 2/1990 Wyeth et al. .................. 372/32

FOREIGN PATENT DOCUMENTS

JP 9-297065 11/1997
JP 2004-61126 2/2004

OTHER PUBLICATIONS

International Search Report issued in International Application No. PCT/JP2004/017962 mailed on Jan. 11, 2005 and English translation thereof, 2 pages.

* cited by examiner

Primary Examiner—Patrick Connolly
(74) Attorney, Agent, or Firm—Osha Liang LLP

(57) ABSTRACT

An optical frequency measurement apparatus of the present invention includes: a coarse light frequency measurer that computes coarse light frequency (Fw) of measured input light based on a reference wavelength that is a wavelength of reference light; a pulsed light source that generates pulsed light including a plurality of optical frequency components with different repetition frequency (fs1) based on reference frequency (Fs) that is frequency of the reference light; a first beat signal generating section that generates a first beat signal having a first difference frequency (fc) that is difference frequency between optical frequency of the pulsed light closest to optical frequency of the measured input light among the plurality of optical frequency components and the optical frequency of the measured input light; a frequency measurer that measures the first difference frequency (fc) of the first beat signal; and an arithmetic section that computes the fine light frequency (Fx) based on the coarse light frequency (Fw), the reference frequency (Fs), the repetition frequency (fs1), and the first difference frequency (fc).

19 Claims, 2 Drawing Sheets

OPTICAL FREQUENCY MEASUREMENT APPARATUS AND OPTICAL FREQUENCY MEASUREMENT METHOD

CROSS REFERENCE TO RELATED APPLICATION

This is a continuation application of PCT/JP2004/017962 filed on Dec. 2, 2004 which claims priority from a Japanese Patent Application(s) NO. 2004-093491 filed on Mar. 26, 2004, the contents of which are incorporated herein by reference.

BACKGROUND

1. Field of the Invention

The present invention relates to an optical frequency measurement apparatus and an optical frequency measurement method. More particularly, the present invention relates to an optical frequency measurement apparatus and an optical frequency measurement method for measuring optical frequency of measured input light.

2. Related Art

Wavelength-division multiplexing communication (WDM) has been developed in order to significantly increase transmission capacity of fiber optic communications. In recent years, multiple-wavelength transmission exceeding 100 channels has been realized, and further high-density multiple-wavelength transmission (DWDM) having an extremely narrow channel spacing of 50 GHz has been realized.

Now, since a related patent document is not recognized, the description is omitted.

In a light wavelength-division multiplexing communication system, it is necessary to accurately monitor optical frequency of each channel to maintain and manage the optical frequency, in order to suppress a cross talk between the channels. For example, when each channel having a channel spacing of 50 GHz performs communication of 40 G bits per second, an allowable error for optical frequency of each channel is around 2.5 GHz, and an allowable error for optical frequency of 1.5 μm band (C band) is around 10-5 to 10-6. Then, a test and a correction for a light wavelength-division multiplexing communication system and the parts further request high measurement accuracy.

SUMMARY

Therefore, it is an object of some embodiments of the present invention to provide a buffer circuit, a driver circuit, and a semiconductor testing apparatus that can solve the foregoing problems. The above and other objects can be achieved by combinations described in the independent claims. The dependent claims define further advantageous and exemplary combinations of the present invention.

According to the first aspect of the present invention, an optical frequency measurement apparatus that measures fine light frequency (Fx) of measured input light includes: a coarse light frequency measurer that computes coarse light frequency (Fw) of the measured input light based on a reference wavelength that is a wavelength of reference light; a pulsed light source that generates pulsed light including a plurality of optical frequency components with different repetition frequency (fs1) based on reference frequency (Fs) that is frequency of the reference light; a first beat signal generating section that generates a first beat signal having a first difference frequency (fc) that is difference frequency between optical frequency of the pulsed light closest to the fine light frequency (Fx) among the plurality of optical frequency components and the fine light frequency (Fx); a frequency measurer that measures the first difference frequency (fc) of the first beat signal; and an arithmetic section that computes the fine light frequency (Fx) based on the coarse light frequency (Fw), the reference frequency (Fs), the repetition frequency (fs1), and the first difference frequency (fc). The pulsed light source may have a first PLL circuit that constantly holds the repetition frequency (fs1) of the pulsed light.

The pulsed light source may generate the pulsed light including the plurality of optical frequency components (Fs±fs2±nfs1) using as a standard optical frequency (Fs±fs2) different from the reference frequency (Fs) by constant frequency (fs2), and the arithmetic section may compute the fine light frequency (Fx) further based on the constant frequency (fs2). The arithmetic section may compute the fine light frequency (Fx) by expression 1 and expression 2 to be described below.

The first beat signal generating section may have: a first light mixer that accepts the measured input light and the pulsed light, and outputs a plurality of beat signals having each difference frequency between the fine light frequency (Fx) and each optical frequency of the plurality of optical frequency components; and a first filter that transmits only the first beat signal having the smallest difference frequency among the plurality of beat signals output from the first light mixer to supply the transmitted beat signal to the frequency measurer.

The optical frequency measurement apparatus may further include a second PLL circuit that holds a second difference frequency, which is difference frequency between optical frequency of the pulsed light closest to the reference frequency (Fs) among the plurality of optical frequency components and the reference frequency (Fs), to the constant frequency (fs2).

The optical frequency measurement apparatus may further include an optical frequency reference source that generates the reference light and supply the generated light to the coarse light frequency measurer and the second PLL circuit.

The second PLL circuit may have: a second light mixer that accepts the measured input light and the pulsed light, and outputs a plurality of beat signals having each difference frequency between the reference frequency (Fs) and each optical frequency of the plurality of optical frequency components; and a second filter that transmits only a second beat signal having the smallest second difference frequency among the plurality of beat signals output from the second light mixer.

The second PLL circuit may have: a constant frequency reference source that outputs an electrical signal with the constant frequency (fs2); a phase comparator that compares the second difference frequency with the constant frequency (fs2) and outputs a comparison result; and a feedback control circuit that controls optical frequency of the pulsed light generated from the pulsed light source to hold the second difference frequency to the constant frequency (fs2) based on the comparison result output from the phase comparator.

The second PLL circuit may further have a switch that selects whether the comparison result obtained by subtracting the constant frequency (fs2) from the second difference frequency is output from the phase comparator or the comparison result obtained by adding the constant frequency (fs2) to the second difference frequency is output from the phase comparator.

The optical frequency measurement apparatus may further include a control section that switches the switch in order to transmit the first beat signal through the first filter, based on an amplitude level of the first beat signal supplied to the frequency measurer or a value of the first difference frequency (fc) measured by the frequency measurer.

The control section may switch the switch when the amplitude level of the first beat signal supplied to the frequency measurer is below a predetermined level or when the value of the first difference frequency (fc) measured by the frequency measurer is outside a predetermined frequency range.

The optical frequency measurement apparatus may further include a control section that controls the constant frequency (fs2) of the electrical signal output from the constant frequency reference source, based on an amplitude level of the first beat signal supplied to the frequency measurer or a value of the first difference frequency (fc) measured by the frequency measurer.

The control section may change the constant frequency (fs2) when the amplitude level of the first beat signal supplied to the frequency measurer is below a predetermined level or when the value of the first difference frequency (fc) measured by the frequency measurer is outside a predetermined frequency range.

The optical frequency measurement apparatus may further include a control section that controls the repetition frequency (fs1) generated from the pulsed light source, based on an amplitude level of the first beat signal supplied to the frequency measurer or a value of the first difference frequency (fc) measured by the frequency measurer.

The control section may change the repetition frequency (fs1) when the amplitude level of the first beat signal supplied to the frequency measurer is below a predetermined level or when the value of the first difference frequency (fc) measured by the frequency measurer is outside a predetermined frequency range.

According to the second aspect of the present invention, an optical frequency measurement apparatus that measures fine light frequency (Fx) of measured input light includes: an optical frequency reference source that generates reference light; a coarse light frequency measurer that computes coarse light frequency (Fw) of the measured input light based on a reference wavelength that is a wavelength of the reference light; a pulsed light source that generates pulsed light including a plurality of optical frequency components with different repetition frequency (fs1); a first beat signal generating section that generates a first beat signal having a first difference frequency (fc) that is difference frequency between optical frequency of the pulsed light closest to the fine light frequency (Fx) among the plurality of optical frequency components and the fine light frequency (Fx); a frequency measurer that measures the first difference frequency (fc) of the first beat signal; an arithmetic section that computes the fine light frequency (Fx) based on the coarse light frequency (Fw), the repetition frequency (fs1), and the first difference frequency (fc); and a control section that controls optical frequency of the pulsed light generated from the pulsed light source, based on an amplitude level of the first beat signal supplied to the frequency measurer or a value of the first difference frequency (fc) measured by the frequency measurer.

According to the third aspect of the present invention, an optical frequency measurement method for measuring fine light frequency (Fx) of measured input light includes: computing coarse light frequency (Fw) of the measured input light based on a reference wavelength that is a wavelength of reference light; generating pulsed light including a plurality of optical frequency components with different repetition frequency (fs1) based on reference frequency (Fs) that is frequency of the reference light; generating a first beat signal having a first difference frequency (fc) that is difference frequency between optical frequency of the pulsed light closest to the fine light frequency (Fx) among the plurality of optical frequency components and the fine light frequency (Fx); measuring the first difference frequency (fc) of the first beat signal; and computing the fine light frequency (Fx) based on the coarse light frequency (Fw), the reference frequency (Fs), the repetition frequency (fs1), and the first difference frequency (fc).

According to the fourth aspect of the present invention, an optical frequency measurement method for measuring fine light frequency (Fx) of measured input light includes: generating reference light; computing coarse light frequency (Fw) of the measured input light based on a reference wavelength that is a wavelength of the reference light; generating pulsed light including a plurality of optical frequency components with different repetition frequency (fs1); generating a first beat signal having a first difference frequency (fc) that is difference frequency between optical frequency of the pulsed light closest to the fine light frequency (Fx) among the plurality of optical frequency components and the fine light frequency (Fx); measuring the first difference frequency (fc) of the first beat signal; computing the fine light frequency (Fx) based on the coarse light frequency (Fw), the repetition frequency (fs1), and the first difference frequency (fc); and controlling optical frequency of the pulsed light based on an amplitude level of the first beat signal or a value of the first measured difference frequency (fc).

The summary of the invention does not necessarily describe all necessary features of the present invention. The present invention may also be a sub-combination of the features described above.

According to an optical frequency measurement apparatus of the present invention, it is possible to measure optical frequency of measured input light with high precision.

DETAILED DESCRIPTION OF THE INVENTION

The invention will now be described based on the preferred embodiments, which do not intend to limit the scope of the present invention, but exemplify the invention. All of the features and the combinations thereof described in the embodiments are not necessarily essential to the invention.

Figure 1:
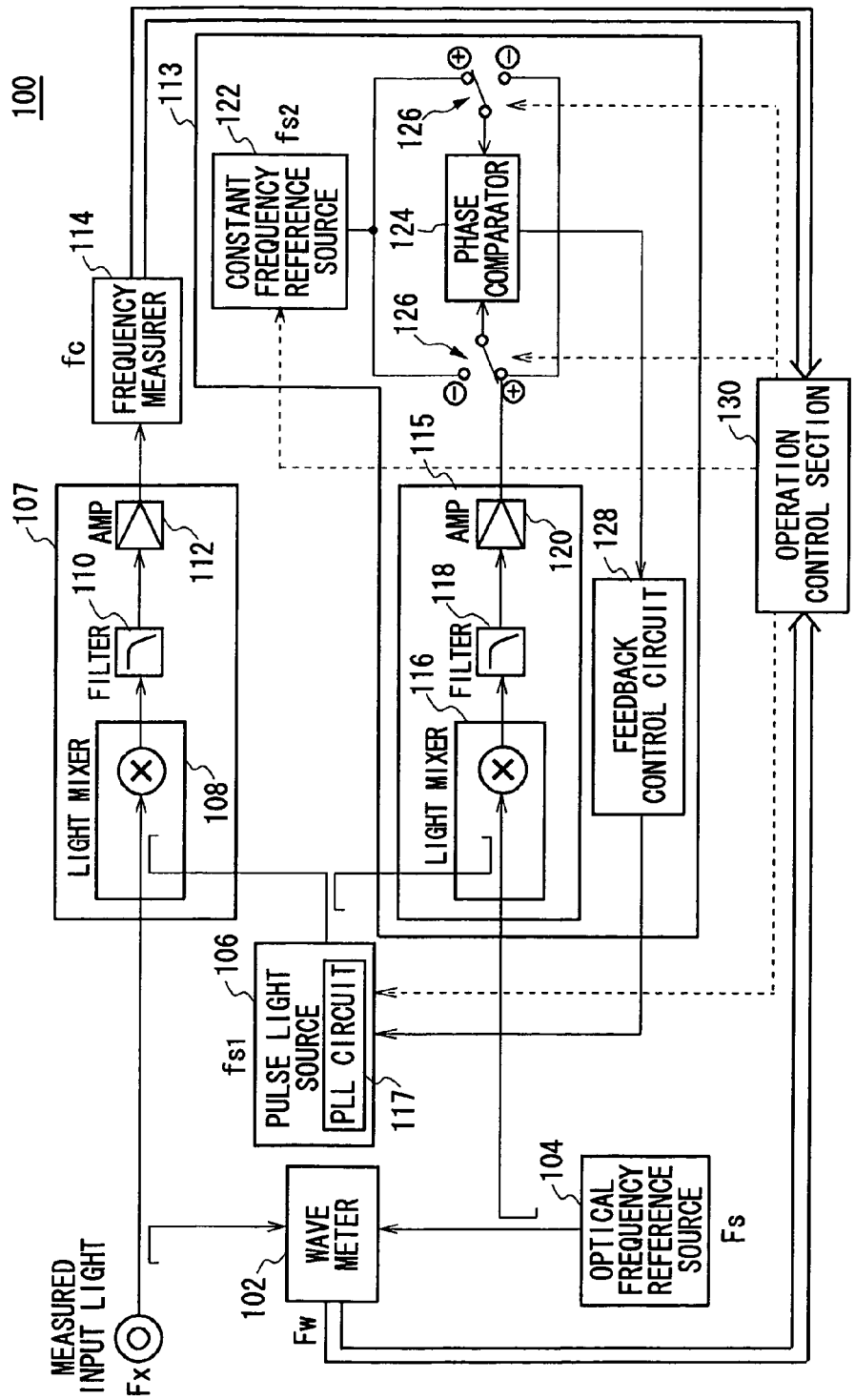
FIG. 1 is a view exemplary showing a configuration of an optical frequency measurement apparatus 100.

FIG. 1 is a view exemplary showing a configuration of an optical frequency measurement apparatus 100 according to an embodiment of the present invention. The optical frequency measurement apparatus 100 includes a wave meter 102, an optical frequency reference source 104, a pulsed light source 106, a beat signal generating section 107, a frequency measurer 114, a PLL circuit 113, and an operation control section 130. In addition, the wave meter 102 is an example of a coarse light frequency measurer in the present invention, and the operation control section 130 is an example of an arithmetic section and a control section in the present invention.

The optical frequency reference source 104 generates reference light and supplies it to the wave meter 102 and a light mixer 116 belonging to the PLL circuit 113. The wave meter 102 computes coarse light frequency (Fw) of measured input light based on a reference wavelength that is a wavelength of the reference light supplied from the optical frequency reference source 104, and supplies the computed coarse light frequency (Fw) to the operation control section 130. Here, coarse light frequency (Fw) is optical frequency of the measured input light measured by the wave meter 102 with low precision, and fine light frequency (Fx) to be described below is optical frequency of the measured input light computed by the operation control section 130 with high precision.

The pulsed light source 106 generates pulsed light including a plurality of optical frequency components with different repetition frequency (fs1) determined based on a control of the operation control section 130 based on reference frequency (Fs) that is frequency of the reference light generated from the optical frequency reference source 104. The pulsed light source 106 has a PLL circuit 117, and the PLL circuit 117 constantly holds the repetition frequency (fs1) of the pulsed light generated from the pulsed light source 106.

The PLL circuit 113 has a beat signal generating section 115, a constant frequency reference source 122, a phase comparator 124, a switch 126, and a feedback control circuit 128. The PLL circuit 113 holds second difference frequency, which is difference frequency between optical frequency of pulsed light closest to the reference frequency (Fs) of the reference light generated from the optical frequency reference source 104 among the plurality of optical frequency components included in the pulsed light generated from the pulsed light source 106 and the reference frequency (Fs), to constant frequency (fs2). Then, under the control of the PLL circuit 113, the pulsed light source 106 generates pulsed light including a plurality of optical frequency components (Fs±fs2±nfs1) using as a standard optical frequency (Fs±fs2) different from the reference frequency (Fs) by the constant frequency (fs2). The pulsed light source 106 is a mode-locked pulsed light source, an optical comb generator profoundly modulating reference light in a phase modulator, etc. It is possible that the pulsed light source 106 variably controls frequency of the plurality of optical frequency components as the repetition frequency (fs1) is constantly held by the PLL circuit 117.

The beat signal generating section 115 has the light mixer 116, a filter 118, and an amplifier (hereinafter, referred to as an AMP) 120. The beat signal generating section 115 generates a second beat signal having a second difference frequency (fc) that is difference frequency between the optical frequency of the pulsed light closest to the reference frequency (Fs) of the reference light generated from the optical frequency reference source 104 among the plurality of optical frequency components included in the pulsed light generated from the pulsed light source 106 and the reference frequency (Fs). More specifically, the light mixer 116 accepts the reference light and the pulsed light, and outputs a plurality of beat signals having each difference frequency between the reference frequency (Fs) and each optical frequency of the plurality of optical frequency components. Then, the filter 118 transmits only the second beat signal having the smallest second difference frequency among the plurality of beat signals output from the light mixer 116. Then, the AMP 120 amplifies the second beat signal output from the filter 118, and supplies the amplified signal to the phase comparator 124 via the switch 126. In addition, the filter 118 may be a low-pass filter or may be a band-pass filter.

The constant frequency reference source 122 outputs an electrical signal with the constant frequency (fs2) determined based on a control of the operation control section 130, and supplies the output electrical signal to the phase comparator 124 via the switch 126. The phase comparator 124 compares the second difference frequency of the second beat signal supplied from the beat signal generating section 115 via the switch 126 with the constant frequency (fs2) of the electrical signal supplied from the constant frequency reference source 122 via the switch 126, and outputs a comparison result. Then, based on the comparison result output from the phase comparator 124, the feedback control circuit 128 controls optical frequency with the plurality of optical frequency components included in the pulsed light generated from the pulsed light source 106 in order to hold the second difference frequency to the constant frequency (fs2). In addition, based on a control of the operation control section 130, the switch 126 selects whether the comparison result obtained by subtracting the constant frequency (fs2) from the second difference frequency is output from the phase comparator 124 or the comparison result obtained by adding the constant frequency (fs2) to the second difference frequency is output from the phase comparator 124.

The beat signal generating section 107 has a light mixer 108, a filter 110, and an AMP 112. The beat signal generating section 107 generates a first beat signal having a first difference frequency (fc) that is difference frequency between optical frequency of the pulsed light closest to fine light frequency (Fx) of the measured input light among the plurality of optical frequency components included in the pulsed light generated from the pulsed light source 106 and the fine light frequency (Fx). More specifically, the light mixer 108 accepts the measured input light and the pulsed light, and outputs a plurality of beat signals having each difference frequency between the fine light frequency (Fx) and each optical frequency of the plurality of optical frequency components. Then, the filter 110 transmits only the first beat signal having the smallest first difference frequency among the plurality of beat signals output from the light mixer 108. Then, the AMP 112 amplifies the first beat signal output from the filter 110, and supplies the amplified signal to the frequency measurer 114. Then, the frequency measurer 114 measures the first difference frequency (fc) of the first beat signal supplied from the beat signal generating section 107, and supplies the measured difference frequency to the operation control section 130. In addition, the filter 110 may be a low-pass filter or may be a band-pass filter.

Based on the coarse light frequency (Fw) supplied from the wave meter 102, the reference frequency (Fs) preset in the optical frequency reference source 104, the repetition frequency (fs1) preset in the pulsed light source 106, the constant frequency (fs2) preset in the constant frequency reference source 122, and the first difference frequency (fc) supplied from the frequency measurer 114, the operation control section 130 computes the fine light frequency (Fx) by means of the following expression. In addition, "+fs2" and "−fs2" are determined by setting the switch 126, and "+fc" and "−fc" are adopted to one side having a smaller rounding error than that of the other side in an operation for the fine light frequency (Fx). The rounding error is caused by a measurement error of the coarse light frequency (Fw) measured by the wave meter 102 and frequency accuracy of the plurality of optical frequency components in the pulsed light source 106, in addition to a measurement error by the frequency measurer 114. When this rounding error is not less than 0.5, the n calculated by the following Expression 2 is not rightly obtained. By using the optical frequency reference source 104 as a standard of the PLL circuit 113 controlling optical frequency of the plurality of optical frequency components from the pulsed light source 106 along with using the optical frequency reference source 104 as a standard of the wave meter 102, it becomes possible to make the rounding error not more than 0.5.

$$Fx = Fs \pm fs2 + nfs1 \pm fc \quad \text{Expression 1}$$

$$n = \left[\frac{1}{fs1}(Fw - Fs \mp fs2 \mp fc)\right]\text{round} \quad \text{Expression 2}$$

Moreover, based on an amplitude level of the first beat signal supplied to the frequency measurer 114 or a measured value of the first difference frequency (fc) measured by the frequency measurer 114, the operation control section 130 may control optical frequency of the plurality of optical frequency components included in the pulsed light generated from the pulsed light source 106. For example, when the amplitude level of the first beat signal supplied to the frequency measurer 114 is below a predetermined level or when the value of the first difference frequency (fc) measured by the frequency measurer 114 is outside a predetermined frequency range, the operation control section 130 changes the optical frequency of the plurality of optical frequency components. That is to say, the operation control section 130 controls the switch 126, the constant frequency reference source 122, or the pulsed light source 106 in order to appropriately transmit the first beat signal through the filter 110.

Specifically, the operation control section 130 changes the optical frequency of the plurality of optical frequency components by means of switching the switch 126 to change a sign output from the phase comparator 124. More specifically, the operation control section 130 changes the optical frequency of the plurality of optical frequency components by means of controlling the constant frequency reference source 122 to change the constant frequency (fs2) output from the constant frequency reference source 122. More specifically, the operation control section 130 changes the optical frequency of the plurality of optical frequency components by means of controlling the pulsed light source 106 to change the repetition frequency (fs1) of the pulsed light generated from the pulsed light source 106.

Figure 2:
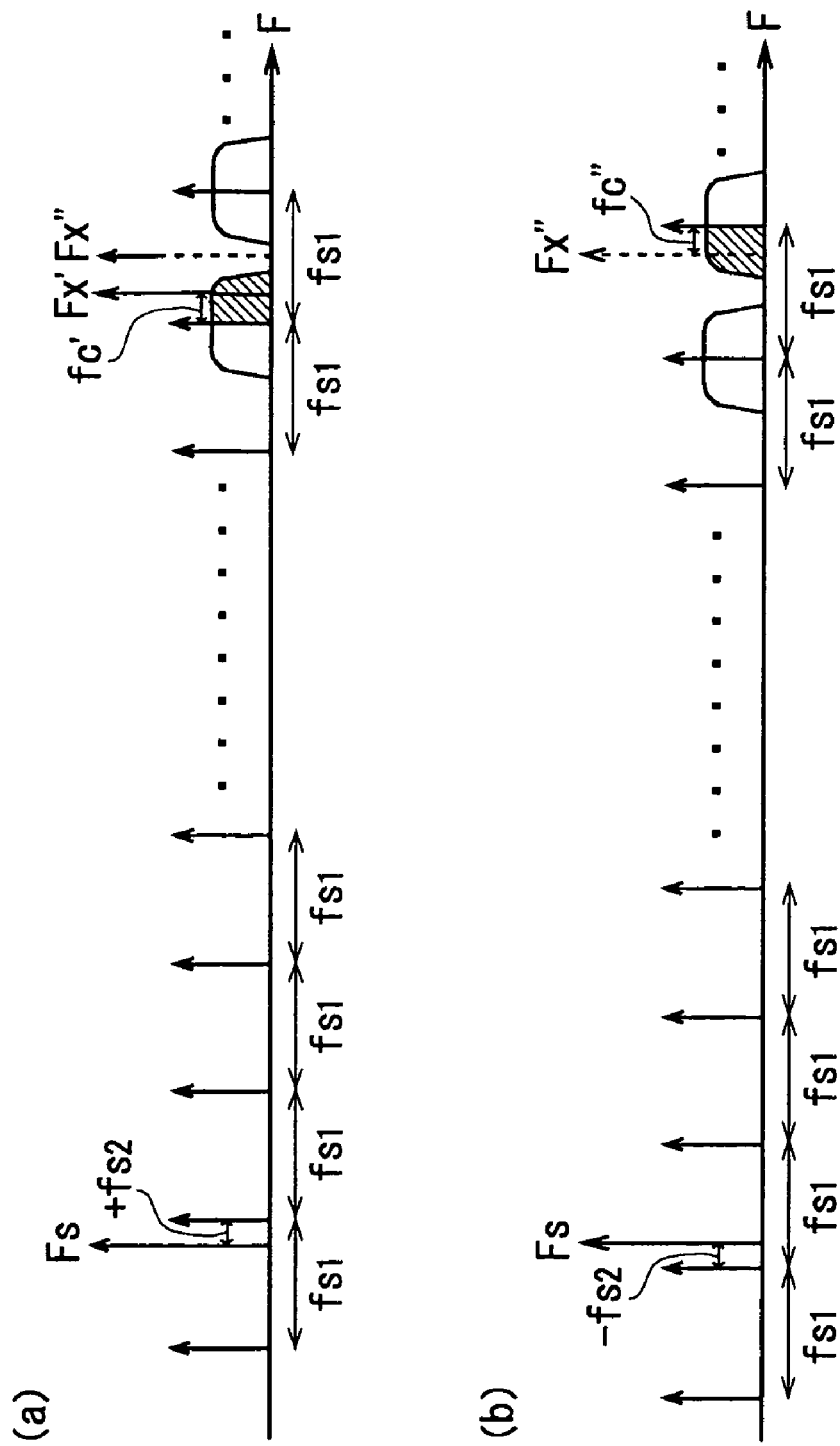
FIGS. 2A and 2B are views exemplary showing optical frequency of measured input light, reference light, and pulsed light.

FIGS. 2A and 2B are views exemplary showing optical frequency of the measured input light, the reference light, and the pulsed light according to the present embodiment. FIG. 2A shows an example in which the switch 126 is set in order to make the phase comparator 124 output the comparison result obtained by subtracting the constant frequency (fs2) from the second difference frequency, that is to say, the pulsed light source 106 generates the optical frequency components each having optical frequency of Fs+f2±nfs1. Moreover, FIG. 2B shows an example in which the switch 126 is set in order to make the phase comparator 124 output the comparison result obtained by adding the constant frequency (fs2) to the second difference frequency, that is to say, the pulsed light source 106 generates the optical frequency components each having optical frequency of Fs−f2±nfs1.

When the fine light frequency of the measured input light is Fx'in the setting of the switch 126 in FIG. 2A, the first beat signal appropriately passes through the filter 110, and thus the first difference frequency fc'can be accurately measured by the frequency measurer 114. However, when the fine light frequency of the measured input light is Fx", the first beat signal does not appropriately pass through the filter 110, and thus the first difference frequency fc" cannot be accurately measured by the frequency measurer 114. On the other hand, when the fine light frequency of the measured input light is Fx"in the setting of the switch 126 in FIG. 2B, the first beat signal appropriately passes through the filter 110, and thus the first difference frequency fc"can be accurately measured by the frequency measurer 114. In this manner, it is possible to control the first difference frequency (fc) of the first beat signal in a transmission band of the filter 110 and accurately measure the first difference frequency (fc) of the first beat signal by means of switching a setting of the switch 126.

According to the optical frequency measurement apparatus 100 of the present embodiment, since the coarse light frequency (Fw) and the first difference frequency (fc) are obtained based on the reference light generated from the optical frequency reference source 104, it is possible to measure optical frequency of the measured input light with high precision even though an optical frequency band of the measured input light is not previously known. Moreover, since it is possible to appropriately transmit only the first beat signal required for measuring the optical frequency of the measured input light through the filter 110 by means of flexibly changing the first difference frequency (fc) of the first beat signal by the switch 126, etc., it is possible to accurately measure the first difference frequency (fc) and thus measure the optical frequency of the measured input light with high precision.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

What is claimed is:

1. An optical frequency measurement apparatus that measures with high precision a fine light frequency of measured input light, comprising:

a coarse light frequency measurer that computes with low precision a coarse light frequency of the measured input light based on a reference wavelength of reference light;

a pulsed light source that generates pulsed light including a plurality of optical frequency components with a repetition frequency based on a reference frequency of the same reference light as used by the coarse light frequency measurer;

a first beat signal generating section that generates a first beat signal having a first difference frequency that is a difference frequency between the fine light frequency and an optical frequency of the pulsed light close to the fine light frequency among the plurality of optical frequency components;

a frequency measurer that measures the first difference frequency of the first beat signal; and an arithmetic section that computes the fine light frequency based on the coarse light frequency, the reference frequency, the repetition frequency, and the first difference frequency and outputs the computed fine light frequency.

2. The optical frequency measurement apparatus as claimed in claim 1, wherein the pulsed light source generates the pulsed light including the plurality of optical frequency components using as a standard optical frequency different from the reference frequency by a constant frequency, and the arithmetic section computes the fine light frequency further based on the constant frequency.

3. The optical frequency measurement apparatus as claimed in claim 2, wherein the arithmetic section computes the fine light frequency by $$Fx = Fs \pm fs2 + nfs1 \pm fc, \quad \text{Expression 1}$$

and $$n = \left[\frac{1}{fs1}(Fw - Fs \mp fs2 \mp fc)\right] \text{round}. \quad \text{Expression 2}$$

wherein Fx is the fine light frequency, Fs is the reference frequency, fs1 is the repetition frequency, fs2 is the constant frequency, fc is the first difference frequency, and Fw is the coarse light frequency.

4. The optical frequency measurement apparatus as claimed in claim 1, wherein the pulsed light source comprises a first PLL circuit that constantly holds the repetition frequency of the pulsed light.

5. The optical frequency measurement apparatus as claimed in claim 1, wherein the first beat signal generating section comprises: a first light mixer that accepts the measured input light and the pulsed light and outputs a plurality of beat signals each having difference frequencies between the fine light frequency and optical frequencies of the plurality of optical frequency components; and a first filter that transmits only the first beat signal having the smallest difference frequency among the plurality of beat signals output from the first light mixer to supply the transmitted beat signal to the frequency measurer.

6. The optical frequency measurement apparatus as claimed in claim 2, further comprising a second PLL circuit that holds a second difference frequency, which is a difference frequency between the reference frequency and an optical frequency of the pulsed light closest to the reference frequency among the plurality of optical frequency components, to the constant frequency.

7. The optical frequency measurement apparatus as claimed in claim 6, further comprising an optical frequency reference source that generates the reference light and supply the generated light to the coarse light frequency measurer and the second PLL circuit.

8. The optical frequency measurement apparatus as claimed in claim 7, wherein the second PLL circuit comprises: a second light mixer that accepts the measured input light and the pulsed light and outputs a plurality of beat signals having each difference frequency between the reference frequency and each optical frequency of the plurality of optical frequency components; and a second filter that transmits only a second beat signal having the smallest second difference frequency among the plurality of beat signals output from the second light mixer.

9. The optical frequency measurement apparatus as claimed in claim 7, wherein the second PLL circuit comprises: a constant frequency reference source that outputs an electrical signal with the constant frequency; a phase comparator that compares the second difference frequency with the constant frequency and outputs a comparison result; and a feedback control circuit that controls optical frequency of the pulsed light generated from the pulsed light source to hold the second difference frequency to the constant frequency based on the comparison result output from the phase comparator.

10. The optical frequency measurement apparatus as claimed in claim 9, wherein the second PLL circuit further comprises a switch that selects whether the comparison result obtained by subtracting the constant frequency from the second difference frequency is output from the phase comparator or the comparison result obtained by adding the constant frequency to the second difference frequency is output from the phase comparator.

11. The optical frequency measurement apparatus as claimed in claim 10, further comprising a control section that switches the switch in order to transmit the first beat signal through the first filter, based on an amplitude level of the first beat signal supplied to the frequency measurer or a value of the first difference frequency measured by the frequency measurer.

12. The optical frequency measurement apparatus as claimed in claim 11, wherein the control section switches the switch when the amplitude level of the first beat signal supplied to the frequency measurer is below a predetermined level or when the value of the first difference frequency measured by the frequency measurer is outside a predetermined frequency range.

13. The optical frequency measurement apparatus as claimed in claim 9, further comprising a control section that controls the constant frequency of the electrical signal output from the constant frequency reference source, based on an amplitude level of the first beat signal supplied to the frequency measurer or a value of the first difference frequency measured by the frequency measurer.

14. The optical frequency measurement apparatus as claimed in claim 13, wherein the control section changes the constant frequency when the amplitude level of the first beat signal supplied to the frequency measurer is below a predetermined level or when the value of the first difference frequency measured by the frequency measurer is outside a predetermined frequency range.

15. The optical frequency measurement apparatus as claimed in claim 9, further comprising a control section that controls the repetition frequency generated from the pulsed light source, based on an amplitude level of the first beat signal supplied to the frequency measurer or a value of the first difference frequency measured by the frequency measurer.

16. The optical frequency measurement apparatus as claimed in claim 15, wherein the control section changes the repetition frequency when the amplitude level of the first beat signal supplied to the frequency measurer is below a predetermined level or when the value of the first difference frequency measured by the frequency measurer is outside a predetermined frequency range.

17. An optical frequency measurement apparatus that measures with high precision a fine light frequency of measured input light, comprising:

an optical frequency reference source that generates reference light;

a coarse light frequency measurer that computes with low precision a coarse light frequency of the measured input light based on a reference wavelength of the reference light;

a pulsed light source that generates pulsed light including a plurality of optical frequency components with a repetition frequency based on a reference frequency of the same reference light as used by the coarse light frequency measurer;

a first beat signal generating section that generates a first beat signal having a first difference frequency that is a difference frequency between the fine light frequency and an optical frequency of the pulsed light close to the fine light frequency among the plurality of optical frequency components;

a frequency measurer that measures the first difference frequency of the first beat signal;

an arithmetic section that computes the fine light frequency based on the coarse light frequency, the repetition frequency, and the first difference frequency; and a control section that controls optical frequency of the pulsed light generated from the pulsed light source, based on an amplitude level of the first beat signal supplied to the frequency measurer or a value of the first difference frequency measured by the frequency measurer.

18. An optical frequency measurement method for measuring with high precision a fine light frequency of measured input light, comprising:

computing with low precision a coarse light frequency of the measured input light based on a reference wavelength of reference light;

generating pulsed light including a plurality of optical frequency components with a repetition frequency based on a reference frequency of the same reference light as used in the step of computing the coarse light frequency;

generating a first beat signal having a first difference frequency that is a difference frequency between the fine light frequency and an optical frequency of the pulsed light close to the fine light frequency among the plurality of optical frequency components;

measuring the first difference frequency of the first beat signal; and computing the fine light frequency based on the coarse light frequency, the reference frequency, the repetition frequency, and the first difference frequency to output the computed fine light frequency.

19. An optical frequency measurement method for measuring with high precision a fine light frequency of measured input light, comprising:

generating reference light;

computing with low precision a coarse light frequency of the measured input light based on a reference wavelength of the reference light;

generating pulsed light including a plurality of optical frequency components with a repetition frequency based on a reference frequency of the same reference light as used in the step of computing the coarse light frequency;

generating a first beat signal having a first difference frequency that is a difference frequency between the fine light frequency and an optical frequency of the pulsed light close to the fine light frequency among the plurality of optical frequency components;

measuring the first difference frequency of the first beat signal;

computing the fine light frequency based on the coarse light frequency, the repetition frequency, and the first difference frequency to output the computed fine light frequency; and controlling optical frequency of the pulsed light based on an amplitude level of the first beat signal or a value of the first measured difference frequency.

* * * * *